United States Patent
Chowdhury et al.

(10) Patent No.: US 7,774,012 B2
(45) Date of Patent: Aug. 10, 2010

(54) METHOD FOR RTP SETUP COORDINATION FOR TALK GROUPS WHEN INTERCONNECTING PUBLIC SAFETY WIRELESS NETWORKS AND COMMERCIAL WIRELESS NETWORKS

(75) Inventors: Sharmin Chowdhury, Naperville, IL (US); Thomas P. Chu, Englishtown, NJ (US); Bryan Kadel, Carol Stream, IL (US); Ping Z. Perzentka, Naperville, IL (US); Charles Salisbury, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 816 days.

(21) Appl. No.: 11/699,943

(22) Filed: Jan. 30, 2007

(65) Prior Publication Data
US 2008/0181145 A1 Jul. 31, 2008

(51) Int. Cl.
*H04Q 7/20* (2006.01)
(52) U.S. Cl. .............. 455/518; 455/519; 455/517; 455/414.1; 455/404.1; 455/404.2; 370/310; 370/401; 370/351; 370/352; 370/355; 379/158; 379/202.01; 379/205.01; 379/45; 379/49
(58) Field of Classification Search .............. 455/518, 455/519, 404.1, 404.2, 414.1–414.4, 422, 455/500, 517, 550.1, 426.1, 426.2, 435, 0.1, 455/435.2, 445; 370/310, 312, 401, 351, 370/352, 355; 379/158, 202.01, 205.01, 379/45, 49
See application file for complete search history.

(56) References Cited

U.S. PATENT DOCUMENTS

2004/0190468 A1* 9/2004 Saijonmaa .............. 370/312
2004/0190535 A1* 9/2004 Albal et al. ............. 370/401
2009/0257378 A1* 10/2009 Cuny et al. ............. 370/328

* cited by examiner

*Primary Examiner*—Keith T Ferguson
(74) *Attorney, Agent, or Firm*—Carmen Patti Law Group, LLC

(57) ABSTRACT

A method and apparatus are provided for a gateway which interconnects public safety wireless networks and commercial wireless networks that support push-to-talk group calls. The gateway translates Real Time Protocol (RTP), Session Invitation Protocol (SIP), and Talk Burst Control Protocol (TBCP)/Real Time Control Protocol (RTCP) messages received from the commercial wireless network and RTP and SIP messages received from the public safety wireless network into a format of the receiving network. The gateway has a call control component operable to set up and tear down RTP connections between the networks, a push-to-talk control component operable to arbitrate calls between wireless communications handsets of both networks, and a transmission control component operable to transfer media packets between the networks. The gateway reduces the number of call set ups required when a caller wants to speak because connections may remain active until the talk group participants leave the push-to-talk group call.

34 Claims, 9 Drawing Sheets

METHOD FOR RTP SETUP COORDINATION FOR TALK GROUPS WHEN INTERCONNECTING PUBLIC SAFETY WIRELESS NETWORKS AND COMMERCIAL WIRELESS NETWORKS

TECHNICAL FIELD

This invention relates to the art of wireless telephony, and more particularly to a method of coordinating real-time protocol setup when interconnecting public safety wireless networks and commercial wireless networks to support push-to-talk group calls.

BACKGROUND

Wireless networks have been in use in the public safety sector, e.g., police, fire fighters, emergency workers, etc., for a long time. In the United States, the standard of public safety wireless network is the Association of Public Safety Communications Officials (APCO) Project 25 (P25) Systems whose specifications are the responsibility of the Telecommunications Industry Association (TIA), standard committee TR-8. The P25 standard is an international standard with systems deployed in over 40 counties.

A critical application for public safety wireless networks is group calls in which a member of the group speaks to all other group members simultaneously. The common name for this feature is push-to-talk (PTT). Illustratively, all police officers on patrol may be a part of the same group. When a police officer wants to speak to the group, the police officer "pushes a button" on a handset of the police officer. A message requesting to speak would then be sent from the handset to the public safety wireless network. A floor control mechanism in the public safety wireless network arbitrates all requests to speak in the event that two or more group members attempt to speak at the same time, and the floor control mechanism either grants or denies the request by sending a response back to the police officer.

Public safety wireless networks supporting push-to-talk group calls have coverage areas typically limited to the size of a city area. In addition, different public safety agencies in the same area, e.g., police and fire-fighters, typically operate their own separate networks. Thus, public safety officials traveling to emergency areas outside of their own jurisdiction lose connectivity to their own public safety wireless network. Also, public safety wireless networks supporting push-to-talk group calls utilize older wireless technologies which lack the features and capacity of commercial wireless networks, e.g., wireless networks operated by carriers such as AT&T, Verizon Wireless, Vodafone Group, etc. Furthermore, response times in public safety wireless networks are critical.

Disadvantageously, expanding the coverage areas of existing public safety wireless networks and upgrading public safety wireless networks with technology comparable to that used in commercial wireless networks may be cost prohibitive for the public safety sector. Also disadvantageously, many public safety wireless networks supporting push-to-talk group calls, such as a network of the police department of a small town, have only a limited amount of channels over an air interface. Thus, when a talk group is inactive for some time, the channel used by the talk group must be released for other calls. Further disadvantageously, many public safety wireless networks supporting push-to-talk group calls do not interoperate to allow policemen, firemen or emergency workers to communicate between their respective networks.

SUMMARY

It has been recognized, in accordance with the principles of the invention, that the problems of the prior art can be overcome by a device that interconnects public safety wireless networks and commercial wireless that support push-to-talk group calls. More specifically, the present invention provides an apparatus for interconnecting public safety wireless networks and commercial wireless networks that support push-to-talk group calls having a) a first component operable to manage messages received in a first format from the commercial wireless network intended for the public safety wireless network, b) a second component connected to the first component, wherein the second component translates messages received in the first format into a second format, and wherein the second component translates messages received in the second format into the first format, and c) a third component connected to the second component, wherein the third component is operable to manage messages received in the second format from the public safety wireless network intended for the commercial wireless network.

Also, the present invention provides a method for interconnecting public safety wireless networks and commercial wireless networks that support push-to-talk group calls having the steps a) establishing a tributary RTP connection between the gateway and a wireless communications handset of a push-to-talk group call in the first wireless network; b) establishing an upstream RTP connection between the gateway and a push-to-talk server in the second wireless network; c) translating messages received in a first format from the wireless communications handset into a second format of the second wireless network; and d) translating messages received in the second format from the second wireless network into the first format of the first wireless network.

DETAILED DESCRIPTION

The present invention provides a device for interconnecting commercial wireless networks and public safety wireless networks that support push-to-talk (PTT) talk group calls. Specifically, the present invention provides a gateway as the means to interconnect commercial wireless networks and public safety wireless networks that support push-to-talk talk group calls so that a talk group can span both networks. The present invention is described within the context of interconnecting Push to Talk over Cellular (POC) standard from the Open Mobile Alliance (OMA), i.e., OMA-POC, based networks and Association of Public Safety Communications Officials (APCO) Project 25 networks, i.e., P25 networks, based on Intra-RF Sub-Systems Interface (ISSI). OMA-POC and ISSI are the emerging standards supporting push-to-talk in commercial wireless network and public safety wireless networks, respectively.

Figure 1:
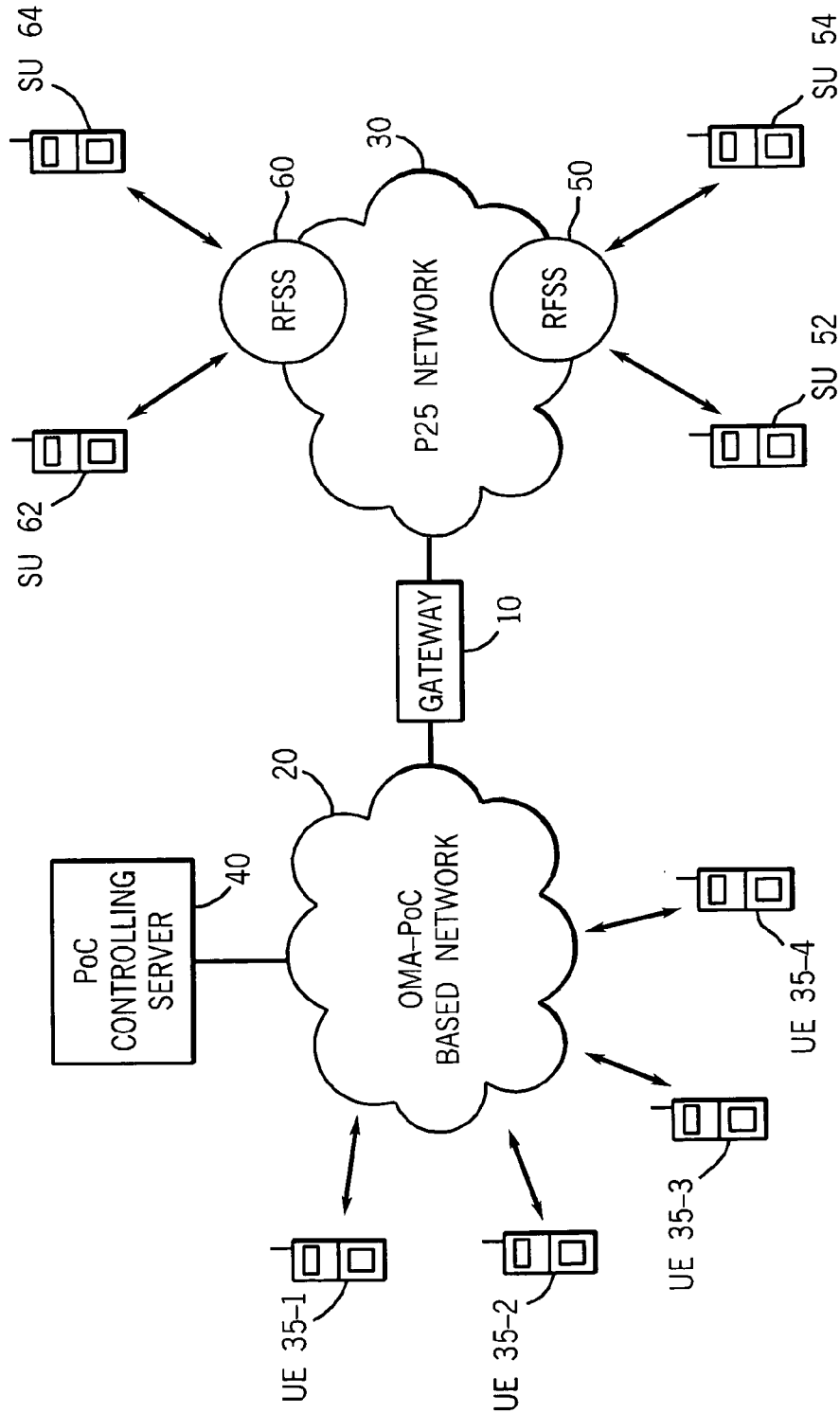
FIG. 1 shows an illustrative view of a network diagram arranged in accordance with the principles of the invention.

FIG. 1 shows an illustrative view of a network diagram arranged in accordance with the principles of the invention. As shown in FIG. 1, communications network 100 includes Gateway 10 situated between OMA-PoC based network 20 and P25 network 30. Gateway 10 connects OMA-PoC based network 20 to P25 network 30 for communication sessions between both networks. User equipment (UE) 35-1, UE 35-2, UE 35-3, UE 35-4, collectively hereinafter UEs 35, are handsets connected to OMA-PoC based network 20 and PoC Controlling Server 40 resides in OMA-PoC based network 20. Radio frequency sub-system (RFSS) 50 and Radio frequency sub-system (RFSS) 60 reside in P25 network 30. Subscriber unit (SU) 52 and SU 54 are handsets connected to RFSS 50 via base stations, not shown, and SU 62 and SU 64 are handsets connected to RFSS 60 via base stations, not shown.

OMA-PoC based network 20 is a commercial wireless network that provides wireless connectivity to wireless communication handsets, e.g., UEs 35, to support push-to-talk group calls within a geographical area. Wireless communication handsets UEs 35 connect to OMA-PoC based network 20 via base stations, not shown.

The three major data streams for push-to-talk are audio traffic, call signaling, and PTT control. The protocols for the conveyance of these data streams in OMA-PoC based network 20 are Real Time Protocol (RTP), Session Invitation Protocol (SIP), and Talk Burst Control Protocol (TBCP)/Real Time Control Protocol (RTCP). Real Time Protocol (RTP) specifies how real time traffic, such as audio and video, is carried over Internet Protocol (IP) networks. UEs 35 are handsets connected, via RTP, to a server, e.g., PoC Controlling Server 40, that supports the push-to-talk function.

Session Invitation Protocol (SIP) is the call signaling protocol used to establish RTP connectivity between UEs 35 and PoC Controlling Server 40 in OMA-PoC based network 20. Voice traffic is encoded as RTP packets. When setting up an RTP connection, an associate connection, known as RTCP is set up simultaneously, i.e. RTP and RTCP are set up in pairs. TBCP/RTCP is the method used to convey push-to-talk control packets in OMA-PoC based network 20. One of the main uses of RTCP is to convey performance statistics from a receiver to the source of a media stream. In addition to its intended use, RTCP may be used to carry other application data.

OMA-PoC based network 20 may be implemented using a wide variety of wireless technologies that support Internet Protocol (IP) service, such as Universal Mobile Telecommunications System (UMTS), Code Division Multiple Access Data Optimized (CDMA-DO), Wireless Fidelity (Wi-fi), and Worldwide Interoperability for Microwave Access (Wi-Max) networks, as will be appreciated by those of ordinary skill in the art.

In an alternative embodiment of the invention, UEs 35 may be connected to a participating server, not shown, which in turn is connected to PoC Controlling Server 40. The participating server provides more flexibility in call control configuration. Regarding push-to-talk control, i.e., TBCP, and media traffic, traffic passes through the participating server.

OMA-PoC based network 20 supports a number of talk group types including a) Ad-hoc talk groups whose membership is created dynamically during session set up; b) Pre-arranged talk groups whose members are set up administratively, and upon set up of a session, the server invites all members to join the session; c) Chat groups whose members are set up administratively. In a chat group, members can join and leave a session at their own initiative. and d) One-to-one sessions.

Gateway 10 is a computer, processor or any combination of processors or computers configured to perform interoperability of communications sessions as well as other management and control tasks. Gateway 10 includes at least the appropriate combination of software, hardware or firmware to interconnect a commercial wireless network, e.g., OMA-PoC based network 20, to a public safety wireless network, e.g., P25 network 30, by providing protocol translation and conversion to support push-to-talk group calls. Gateway 10 manages a) SIP messages, Talk Burst Control Protocol (TBCP)/Real Time Control Protocol (RTCP) messages, and RTP messages from OMA-PoC based network 20 to P25 network 30 and b) SIP messages and RTP messages from P25 network 30 to OMA-PoC based network 20.

P25 network 30 is a public safety wireless network that provides wireless connectivity to wireless communication handsets, e.g., SU 52, SU 54, SU 62 and SU 64, within a geographical area. P25 network 30 may consist of a number of base stations, not shown, that are connected to a collection of system controllers, e.g., RFSS 50 and RFSS 60. Wireless communication handsets, e.g., SU 52, SU 54, SU 62 and SU 64 connect to the base stations through an air interface.

RFSS 50 and RFSS 60 have sub-components that provide call signaling functions, media control, i.e., forwarding and processing of voice traffic, and other functions. RFSS 50 and RFSS 60 may be connected via an Intra-RF Sub-Systems Interface (ISSI) standard to form a larger network with a much larger coverage. With ISSI, the call signaling protocol is based on SIP, while the push-to-talk control messages are carried through the use of RTP with or without voice frames. With ISSI, a talk group can span multiple RFSSs. Either RFSS 50 or RFSS 60 may be designated as the home RFSS which will manage all activities of the talk group. A floor arbitrate function of the talk group resides at the home RFSS. Members of a group may roam from the home RFSS to the other RFSSs. The non-home RFSS may be referred to as a serving RFSS, and is connected to the home RFSS through RTP. When a wireless communication handset, e.g., SU 52, SU 54, SU 62 or SU 64, at a serving RFSS indicates that it would like join a group, the serving RFSS will register to the home RFSS indicating that there are one or more SUs at its location joining the group. Specifically, when the SU requests the floor, e.g., permission to talk, the serving RFSS will forward the request to the home RFSS using ISSI. The home RFSS arbitrates the requests and awards the floor to the winning wireless communication handset. In addition to floor arbitration, the home RFSS also receives voice traffic from a serving RFSS and forwards the voice traffic to other RFSSs.

ISSI provides a set of control messages to support push-to-talk, which are encoded as part of the RTP messages. RTP connectivity must be established through call control before push-to-talk control messages and voice traffic can be sent between the home RFSS and the serving RFSSs. Call control can only take place upon the completion of registration.

Normally in ISSI, RTP connectivity between a serving RFSS and the home RFSS goes up and down dynamically as the group becomes active and inactive to conserve network resources. During this period, the serving RFSSs remain registered with the home RFSS. When the call becomes active again, the home RFSS or the serving RFSS can trigger call set up to re-establish the RTP connectivity. This connectivity is referred to as the non-persistent RTP model. Non-persistent RTP has the advantage of using less network resources when the group is inactive. Disadvantageously, when a speaker requests the floor when RTP is not set up, there is an extra delay in sending the floor request to the home RFSS. In another embodiment o the invention, the RTP connections may be set up upon registration of a group member, and the RTP connections may be torn down when all members of the talk group served by the RFSS leave the group. This mode of operation is referred to as the persistent RTP model.

Figure 2:
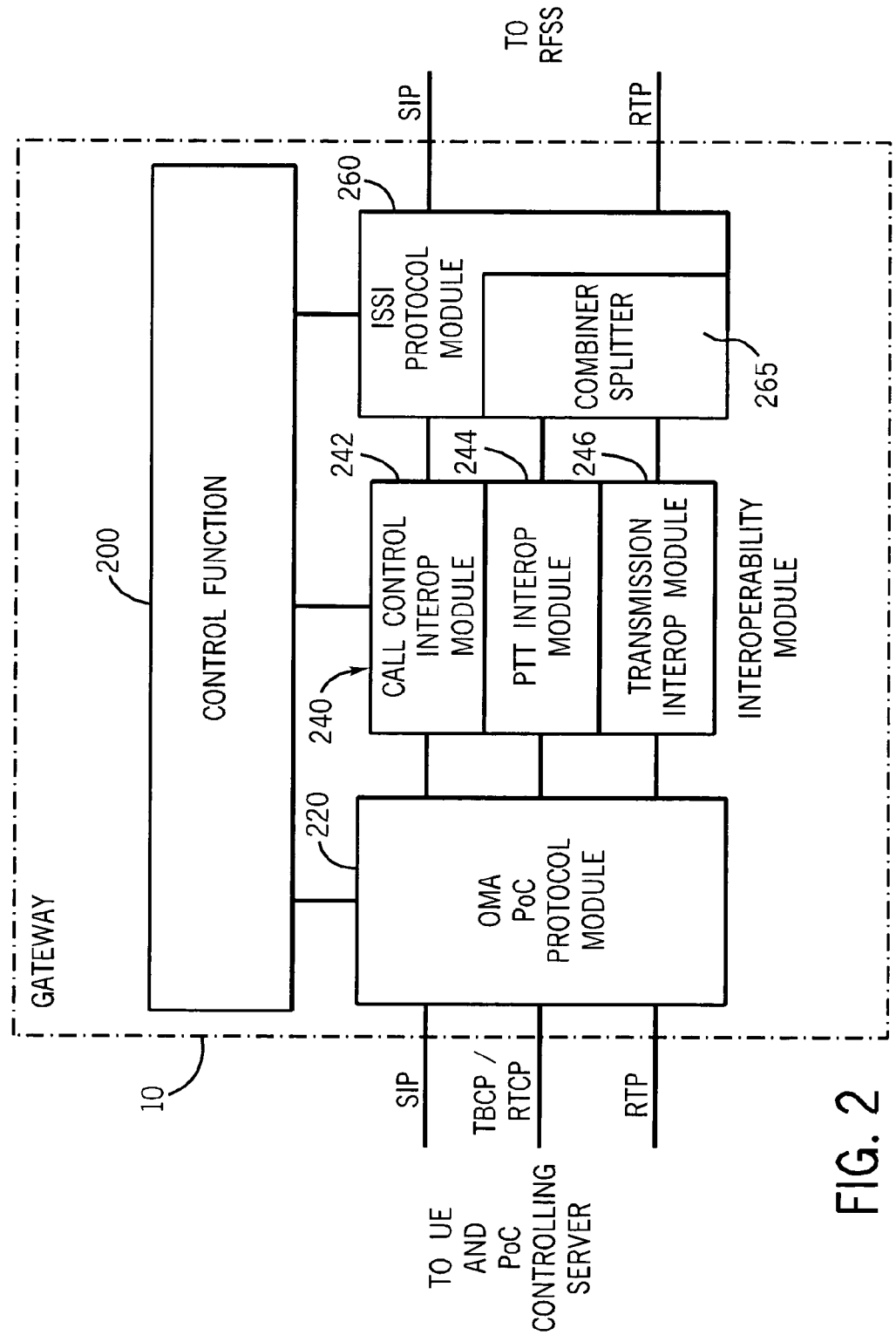
FIG. 2 shows an illustrative view of a gateway arranged in accordance with the principles of the invention.

FIG. 2 shows an illustrative view of a gateway arranged in accordance with the principles of the invention. The various elements depicted in FIG. 2 may be implemented using any combination of hardware, software, or firmware using known techniques in accordance with the teachings herein. Also, the various elements illustrate an exemplary configuration and partition of functions. Furthermore, the various elements may be implemented in a centralized manner having all of the elements within a single physical device, or in a distributed manner in which the various elements are housed in separate physical devices. In FIG. 2, Gateway 10 has a Control Function 200 which is connected to OMA-PoC Protocol Module 220, Interoperability Module 240, and ISSI Protocol Module 260.

Control Function 200 manages functions and data used by OMA-PoC Protocol Module 220, Interoperability Module 240, and ISSI Protocol Module 260 of Gateway 10. Control Function 200 has external interfaces for functions such as network operator commands, authentication and authorization of data bases. Control Function 200 directs the activities of Interoperability Module 240 that are based on policy rather than on protocol specifications. These activities include local arbitration of calls, monitoring of events and timers, and error recovery.

OMA-PoC Protocol Module 220 manages communications received from handsets, e.g., LJEs 35, and servers, e.g., PoC Controlling Server 40, of a commercial wireless network, e.g., OMA-PoC based network 20. OMA-PoC Protocol Module 220 has separate logical interfaces for SIP messages, TBCP/RTCP messages, and RTP messages from OMA-PoC based network 20. SIP is used to establish initial communications with the handsets, and to negotiate the TBCP/RTCP and the RTP stream setup. RTP contains the media, e.g., audio, video, or other streams based media, sent between UEs 35 and Gateway 10. The TBCP/RTCP messages contain control messages sent via the media stream. OMA-PoC Protocol Module 220 supports losing audio and early audio with an early media detector and policy based losing audio filter. OMA-PoC Protocol Module 220 is connected to Interoperability Module 240 and Control Function 200 of Gateway 10.

Interoperability Module 240 provides the interworking logic and state machines required for Gateway 10 to inter-work communications between a commercial wireless network, e.g., OMA-PoC based network 20, and a public safety wireless network, e.g., P25 network 30. Interoperability Module 240 is connected to OMA-PoC Protocol Module 220, ISSI Protocol Module 260 and Control Function 200 of Gateway 10. Interoperability Module 240 has three sub-components which are Call Control Interop Module 242, PTT Interop Module 244, and Transmission InterOp Module 246.

Call Control Interop Module 242 manages connectivity, i.e., set up and tear down of connections, between talk group components, e.g., handsets, push-to-talk servers, and provides interworking for SIP messages.

PTT Interop Module 244 manages the operation, e.g., floor control arbitration, call preemption, etc., of the talk group and provides interworking for TBCP/RTCP messages. PTT Interop Module 244 tracks the local winner of a floor arbitration as determined by OMA-PoC Protocol Module 220 and a global winner of a floor arbitration as determined by the home RFSS. PTT Interop Module 244 coordinates all push-to-talk activities between OMA-PoC based network 20 and P25 network 30. PTT Interop Module 244 triggers requests to LSSI Protocol Module 260 when the local winner of the floor arbitration has a higher priority than the global winner. Also, PTT Interop Module 244 filters any unnecessarily messages from OMA-PoC Protocol Module 220 and ISSI Protocol Module 260.

Transmission InterOp Module 246 manages the transfer of media packets between networks and provides interworking for RTP messages. Transmission InterOp Module 246 provides a) translation of a UE-identifier to a SU-identifier in the RTP packets, b) audio codec translation if different codecs are used in OMA-PoC based network 20 and P25 network 30, and c) re-sequencing of a RTP sequence number and re-mapping of a RTP time-stamp, if necessary.

ISSI Protocol Module 260 manages communications received from RFSSs, e.g., RFSS 50 and RFSS 60, of a public safety wireless network, e.g., P25 network 30. ISSI Protocol Module 260 has separate interfaces for SIP messages and RTP messages from P25 network 30. SIP is the call control signaling protocol used to establish initial communications with RFSS 50 and RFSS 60, and to negotiate the RTP stream setup. RTP packets contain the media, e.g., audio, video, or other streams based media, multiplexed with the push-to-talk control messages sent between RFSS 50 and/or RFSS 60 and Gateway 10.

Combiner/Splitter 265 is a sub-component of ISSI Protocol Module 260. Depending on the direction of information flow, Combiner/Splitter 265 a) combines the RTP traffic received from Transmission InterOp Module 246 and push-to-talk control packets received from ISSI Protocol Module 260 into a single RTP stream format to be transmitted by ISSI Protocol Module 260 or b) splits the RTP packets received from ISSI Protocol Module 260, and directs push-to-talk control packets to PTT Interop Module 244 and directs the audio traffic to the Transmission InterOp Module 246. ISSI Protocol Module 260 is connected to Interoperability Module 240 and Control Function 200 of Gateway 10.

Figure 3:
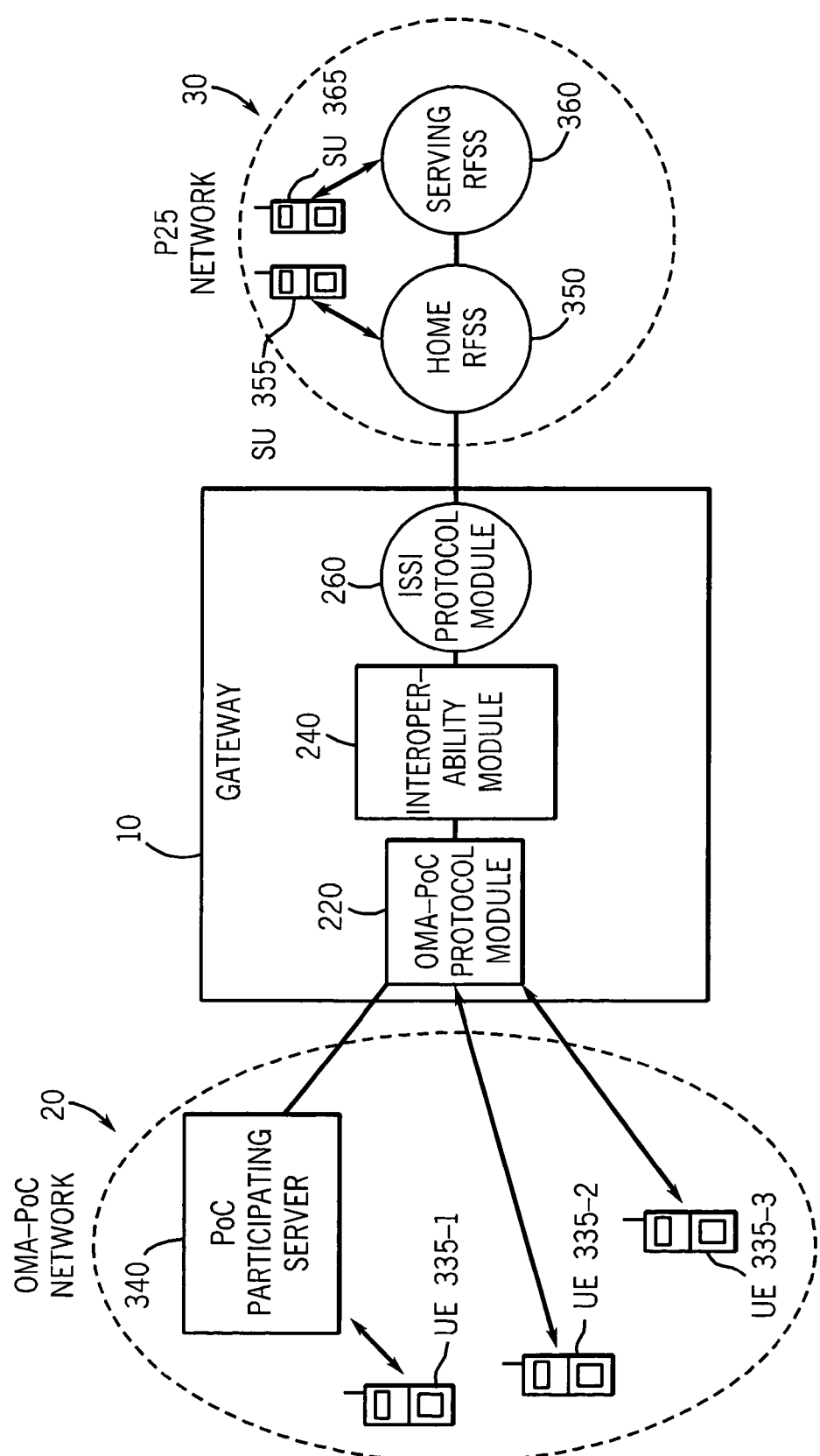
FIG. 3 shows another illustrative view of a network diagram arranged in accordance with the principles of the invention in which the home of the push-to-talk talk group resides in the public safety wireless network.

FIG. 3 shows another illustrative view of a network diagram arranged in accordance with the principles of the invention in which the home of the push-to-talk talk group resides in the public safety wireless network. In FIG. 3, the push-to-talk server is a home RFSS, e.g., home RFSS 350, in P25 network 30. In general, the push-to-talk server may be a home RFSS in P25 network 30 or a PoC Controlling Server in OMA-PoC based network 20.

In FIG. 3, Gateway 10 is connected via SIP and RTP protocols to UE 335-1, UE 335-2, and UE 335-3, collectively hereinafter UEs 335 in OMA-PoC based network 20. In this arrangement, OMA-PoC Protocol Module 220 of Gateway 10 functions as a PoC Controlling Server to UEs 335 for a particular call group in OMA-PoC based network 20. Also, Gateway 10 is connected to home RFSS 350 in P25 network 30. ISSI Protocol Module 260 of Gateway 10 functions as a serving RFSS to home RFSS 350. This means that, from the viewpoint of home RFSS 350, Gateway 10 operates exactly like serving RFSS 360. Other serving RFSSs may be connected to home RFSS 350. SU 355 is connected to home RFSS 350 and SU 365 is connected to serving RFSS 360.

Two RTP segments are shown in FIG. 3. A first segment is established between any of the UEs 335 and Gateway 10. A second segment is established between Gateway 10 and home RFSS 350, i.e., the push-to-talk server. The segments between UEs 335 and Gateway 10 may be referred to as tributary segments. The segment between Gateway 10 and home RFSS 350 may be referred to as an upstream segment. Note that the connection between Gateway 10 and the push-to-talk server is always the upstream segment, even when the push-to-talk server is located in the commercial wireless network, i.e., OMA-PoC based network 20. The RTP connection of either segment can operate in a persistent or a non-persistent mode. Persistent mode refers to the mode of operation in which a handset will initiate RTP connection set up upon registration, regardless of whether there is voice activity or not. The connection will remain active until the group is deactivated at the handset. A non-persistent mode of operation refers to tearing down the SIP dialogue and the RTP connection together or tearing down the RTP connection but maintaining the SIP dialogue.

In operation, Gateway 10 may be viewed in terms of four configurations of persistent and non-persistent modes. In Configuration 1, both RTP segments are persistent. In Configuration 2, a persistent tributary segment is established between UEs 335 and Gateway 10, and a non-persistent upstream RTP segment is established between Gateway 10 and home RFSS 350. In Configuration 3, a non-persistent tributary RTP segment is established between UEs 335 and Gateway 10, and a persistent upstream RTP segment is established between Gateway 10 and home RFSS 350. In Configuration 4, both RTP segments are non-persistent.

When both RTP segments operate in the persistent mode, i.e., configuration 1, the connected networks have superior performance, i.e., response time, as no SIP call set up is involved when a caller wants to speak to the group. All RTP connections are already set up. A first tributary segment is established, i.e., set up, between UEs 335 and Gateway 10 when a UE, e.g., UE 335-1, joins a talk group and completes its registration to Gateway 10. The registration of UE 335-1 with Gateway 10 triggers registration of Gateway 10 to home RFSS 350. This is followed immediately by the setup of the upstream RTP segment to home RFSS 350. Gateway 10 tears down the first tributary segment when UE 335-1 leaves the group, and Gateway 10 tears down the upstream connection when all handsets from other tributary segments leave the group. Thus, the connection, and the ultimate tear down of the connection, between Gateway 10 and home RFSS 350 is triggered based on membership to a group at Gateway 10 rather than voice activity.

Configuration 1 requires more network resources than alternative configurations, and may not be suitable for networks in which network resources are constrained. Another concern is that not all P25 networks support the persistent mode of operation.

When a persistent tributary segment is established between UEs 335 and Gateway 10, and a non-persistent upstream RTP segment is established between Gateway 10 and home RFSS 350, i.e., configuration 2, a single call set up is required when a caller attempts to access the floor. The single call set up is the non-persistent upstream segment between Gateway 10 and home RFSS 350. When the talk group is inactive, the non-persistent upstream segment is down. Gateway 10 may monitor for push-to-talk control messages or media traffic and detect when the talk group is active, and set up the connection for the non-persistent upstream segment when either an UE, e.g., UE 335-1, or a SU, e.g., SU 365, requests the floor. Gateway 10 detects the UE requesting the floor when a TBCP request is received. When the SU requests the floor, home RFSS 350 will initiate the RTP setup. The non-persistent upstream segment connection remains active until the push-to-talk group call is inactive. Then Gateway 10 tears down the non-persistent upstream segment connection. Note that the persistent tributary segment is set up upon registration of a UE with Gateway 10.

When a non-persistent tributary RTP segment is established between UEs 335 and Gateway 10 and a persistent upstream RTP segment is established between Gateway 10 and home RFSS 350, i.e., configuration 3, a single call set up is involved when a caller wants to access the floor. The single call set up is the non-persistent tributary RTP segment between Gateway 10 and UEs 335. Multiple UEs may be registered to Gateway 10. Some of the UEs may operate in persistent mode while others may operate in non-persistent mode. The persistent upstream RTP segment is set up when the first UE, e.g., UE 335-1, registers with Gateway 10 for the talk group. When the talk group is inactive when operating in non-persistent RTP mode, some of UEs 335 may not have their tributary segments set up. Gateway 10 may detect when the talk group is active, and set up the connection for the non-persistent tributary RTP segment when either an UE, e.g., UE 335-1, or a SU, e.g., SU 365, requests the floor. Gateway 10 detects UE 335-1 requesting the floor when a TBCP request is received by OMA-PoC Protocol Module 220. Gateway 10 detects SU 365 requesting the floor when ISSI Protocol Module 260 detects the following ISSI PTT-control messages: PTT-transmit-request, PTT-transmit-progress, PTT-transmit-grant, and PTT-transmit-start. PTT-transmit-grant and PTT-transmit-start messages contain the identity of the floor winner. Upon detecting that the group is active, Call Control Interop Module 242 sends a PoC-activate-group message to OMA-PoC Protocol Module 220, which initiates RTP connection set up to all UEs that are not already connected. The non-persistent tributary RTP segment connection remains active until the push-to-talk group call is inactive. Then Gateway 10 tears down the non-persistent tributary RTP segment connection. The persistent RTP segment connection remains active until all wireless communications handsets from the commercial wireless network leave the push-to-talk group call. Then Gateway 10 tears down the persistent RTP segment connection.

When a non-persistent tributary RTP segment is established between UEs 335 and Gateway 10 and a non-persistent upstream RTP segment is established between Gateway 10 and home RFSS 350, i.e., configuration 4, some floor requests may require two RTP setups. The non-persistent tributary RTP segment connection and the non-persistent upstream RTP segment connection remain active until the push-to-talk group call is inactive. The tear down of the non-persistent upstream RTP segment connection by Gateway 10 triggers the tear down of all non-persistent connections. Configuration 4 increases the response time significantly, which is least desirable from a performance perspective. However, configuration 4 requires the least amount of network resources when the talk group is not active. Configuration 4 may be considered as a combination of configurations 2 and 3.

Figure 4:
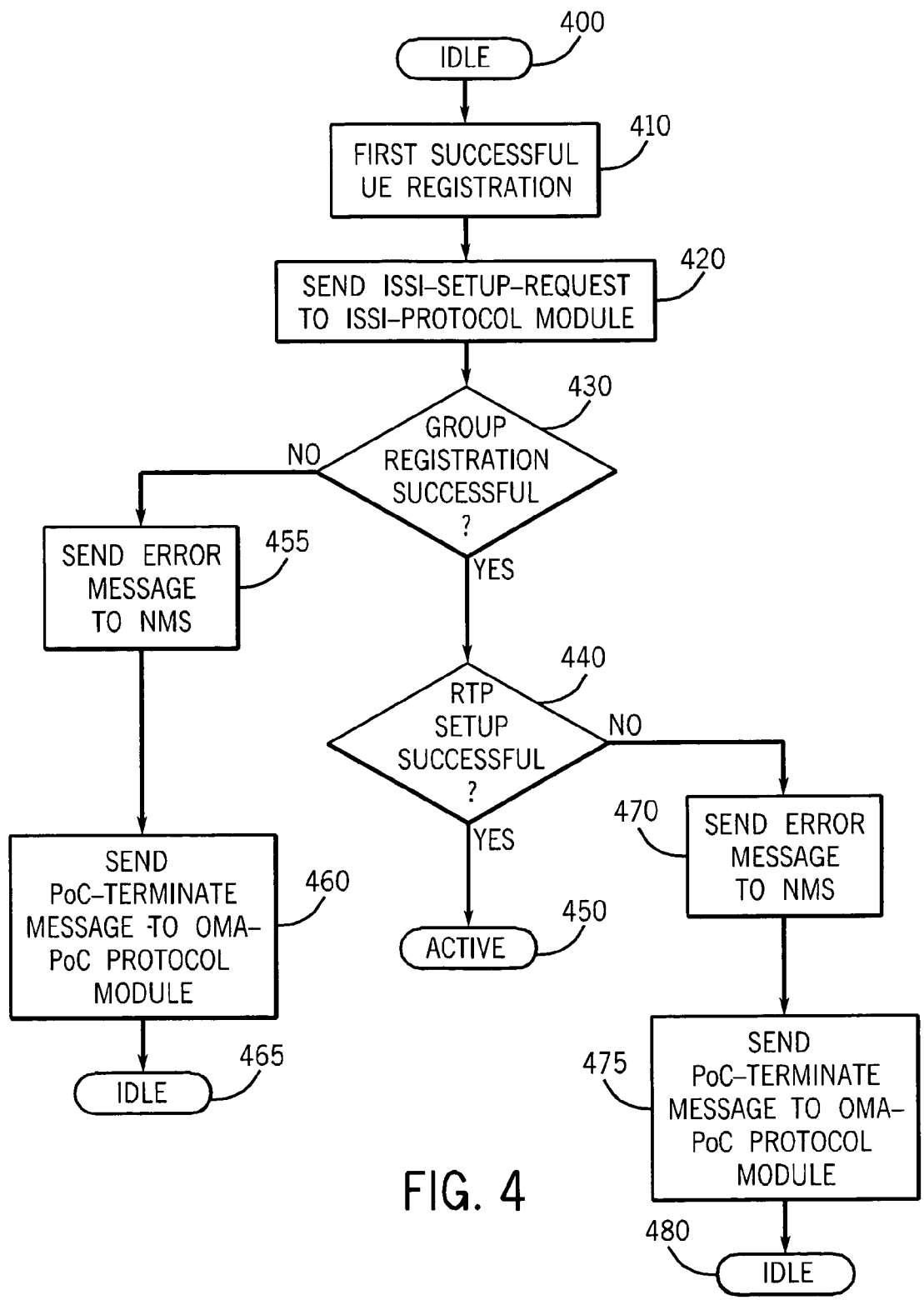
FIG. 4 shows an illustrative flow chart for a method of operating the present invention in accordance with the principles of the invention when both Real Time Protocol (RTP) segments are persistent.

FIG. 4 shows an illustrative flow chart for a method of operating the present invention in accordance with the principles of the invention when both RTP segments are persistent.

The process is entered in step 400 (FIG. 4), with Call Control Interop Module 242 (FIG. 2) in an idle state, i.e., no UEs are registered to Gateway 10 (FIG. 3) for the talk group, Gateway 10 is not registered to the home RFSS, e.g., home RFSS 350 (FIG. 3), and there is no SIP/RTP connection between Gateway 10 and home RFSS 350.

In step 410 (FIG. 4), upon receipt of a successful registration with Gateway 10 (FIG. 3) by a UE, e.g., UE 335-1 (FIG. 3), a tributary RTP segment is set up between UE 335-1 and Gateway 10. OMA-PoC Protocol Module 220 (FIG. 2) sends a PoC-group-register message to Call Control Interop Module 242 to indicate that UE 335-1 (FIG. 3) has registered at Gateway 10.

In step 420 (FIG. 4), upon receipt of the PoC-group-register message, Call Control Interop Module 242 (FIG. 2) sends an ISSI-setup-request to ISSI Protocol Module 260 to set up an RTP connection with home RFSS 350 (FIG. 3).

In step 430 (FIG. 4), it is necessary to determine, upon receipt of an ISSI-registration-response from ISSI Protocol Module 260 (FIG. 2) to Call Control Interop Module 242, whether the group registration with home RFSS 350 (FIG. 3) was successful.

If the test result in conditional branch point 430 (FIG. 4) is NO, indicating that the talk group registration failed, then control is passed to step 455.

In step 455 (FIG. 4), Call Control Interop Module 242 (FIG. 2) generates an error message, e.g., home RFSS unreachable, to a network management system (NMS), not shown.

In step 460 (FIG. 4), Call Control Interop Module 242 (FIG. 2) sends a PoC-terminate message to OMA-PoC Protocol Module 220 which indicates that the talk group is terminated and OMA-PoC Protocol Module 220 should de-register any registered UEs, e.g., UEs 335 (FIG. 3).

In step 465 (FIG. 4), Call Control Interop Module 242 (FIG. 2) enters the idle state.

If the test result in conditional branch point 430 (FIG. 4) is YES, indicating that the group registration was successful, then control is passed to step 440.

In step 440 (FIG. 4), it is necessary to determine, upon receipt of an ISSI-setup-response from ISSI Protocol Module 260 (FIG. 2) to Call Control Interop Module 242, whether the RTP set up was successful.

If the test result in conditional branch point 440 (FIG. 4) is YES, indicating that the RTP set up was successful, then control is passed to step 450.

In step 450 (FIG. 4), Call Control Interop Module 242 (FIG. 2) enters the active state, i.e., UE 335-1 (FIG. 3) is registered to Gateway 10 for the talk group and there is a SIP/RTP connection between Gateway 10 and home RFSS 350.

If the test result in conditional branch point 440 (FIG. 4) is NO, indicating that the RTP set up failed, then control is passed to step 470.

In step 470 (FIG. 4), Call Control Interop Module 242 (FIG. 2) generates an error message to the network management system (NMS), not shown.

In step 475 (FIG. 4), Call Control Interop Module 242 (FIG. 2) sends a PoC-terminate message to OMA-PoC Protocol Module 220 which indicates that the talk group is terminated and OMA-PoC Protocol Module 220 should de-register any registered UEs, e.g., UEs 335 (FIG. 3).

In step 480 (FIG. 4), Call Control Interop Module 242 (FIG. 2) enters the idle state.

Figure 5:
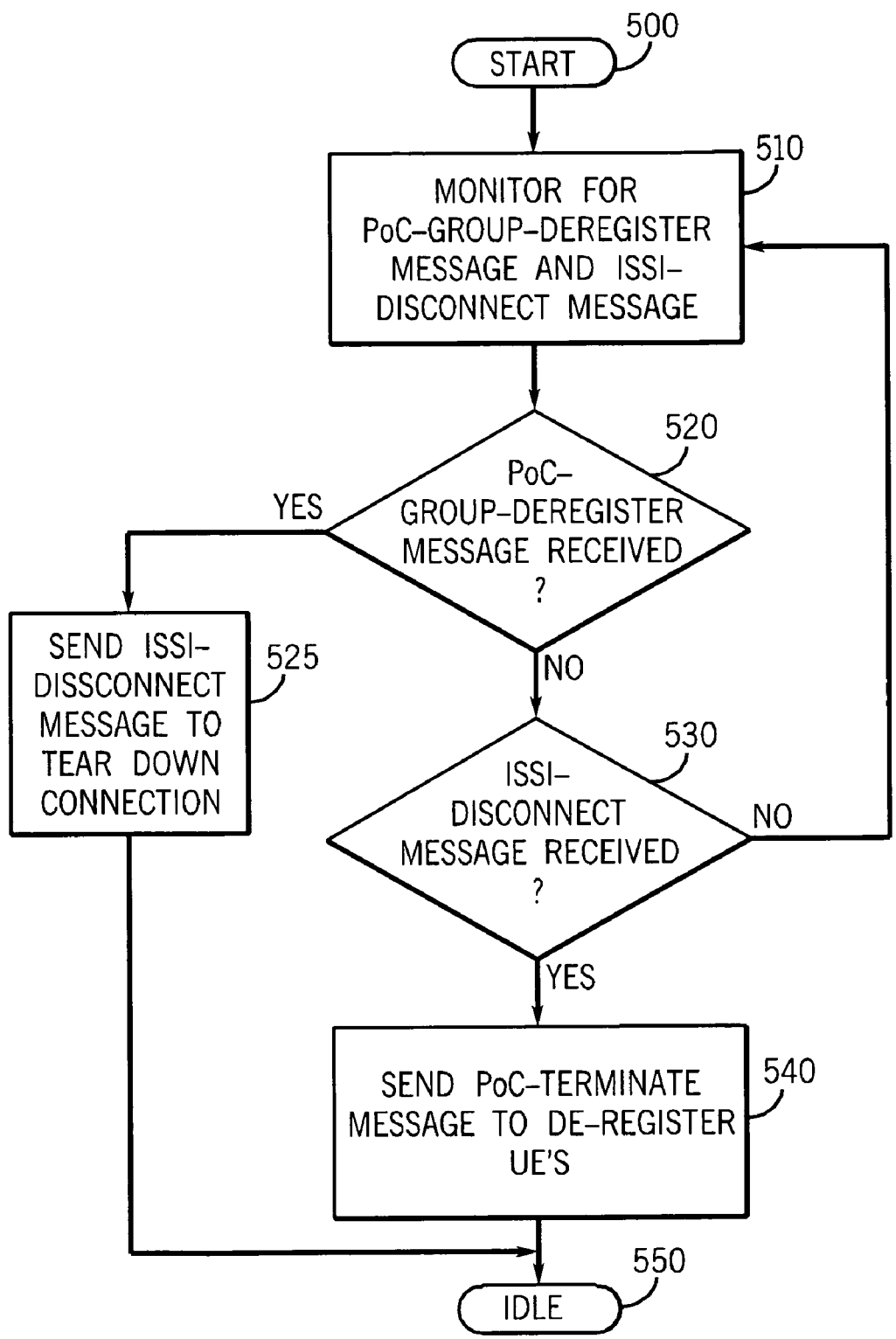
FIG. 5 shows an illustrative flow chart for a method of operating the present invention in accordance with the principles of the invention for the tear down of an upstream segment.

FIG. 5 shows another illustrative flow chart for a method of operating the present invention in accordance with the principles of the invention for the tear down of an upstream segment. The process is entered in step 500.

In step 510 (FIG. 5), Call Control Interop Module 242 (FIG. 2) monitors for a PoC-group-deregister message from OMA-PoC Protocol Module 220 and an ISSI-disconnect message from ISSI Protocol Module 260.

In step 520 (FIG. 5), it is necessary to determine whether Call Control Interop Module 242 (FIG. 2) has received a PoC-group-deregister message from OMA-PoC Protocol Module 220.

If the test result in conditional branch point 520 (FIG. 5) is YES, indicating that the PoC-group-deregister message was received, i.e., the last LJE has de-registered, then control is passed to step 525.

In step 525 (FIG. 5), Call Control Interop Module 242 (FIG. 2) sends the ISSI-disconnect message to ISSI Protocol Module 260 to initiate RTP connection tear down procedures. Then control is passed to step 550 (FIG. 5).

If the test result in conditional branch point 520 (FIG. 5) is NO, indicating that the PoC-group-deregister message was not received, then control is passed to step 530.

In step 530 (FIG. 5), it is necessary to determine whether Call Control Interop Module 242 (FIG. 2) has received an ISSI-deregister-indication from ISSI Protocol Module 260.

If the test result in conditional branch point 530 (FIG. 5) is NO, indicating that the ISSI-deregister-indication was not received, then control is passed to step 520.

If the test result in conditional branch point 530 (FIG. 5) is YES, indicating that the ISSI-deregister-indication was received, i.e., Gateway 10 (FIG. 3) has been de-registered from home RFSS 350, then control is passed to step 540.

In step 540 (FIG. 5), Call Control Interop Module 242 (FIG. 2) sends the PoC-terminate message to OMA-PoC Protocol Module 220 to de-register all UEs 335, i.e., tear down a tributary segment. Then control is passed to step 550 (FIG. 5).

In step 550 (FIG. 5), Call Control Interop Module 242 (FIG. 2) enters the inactive state.

Figure 6:
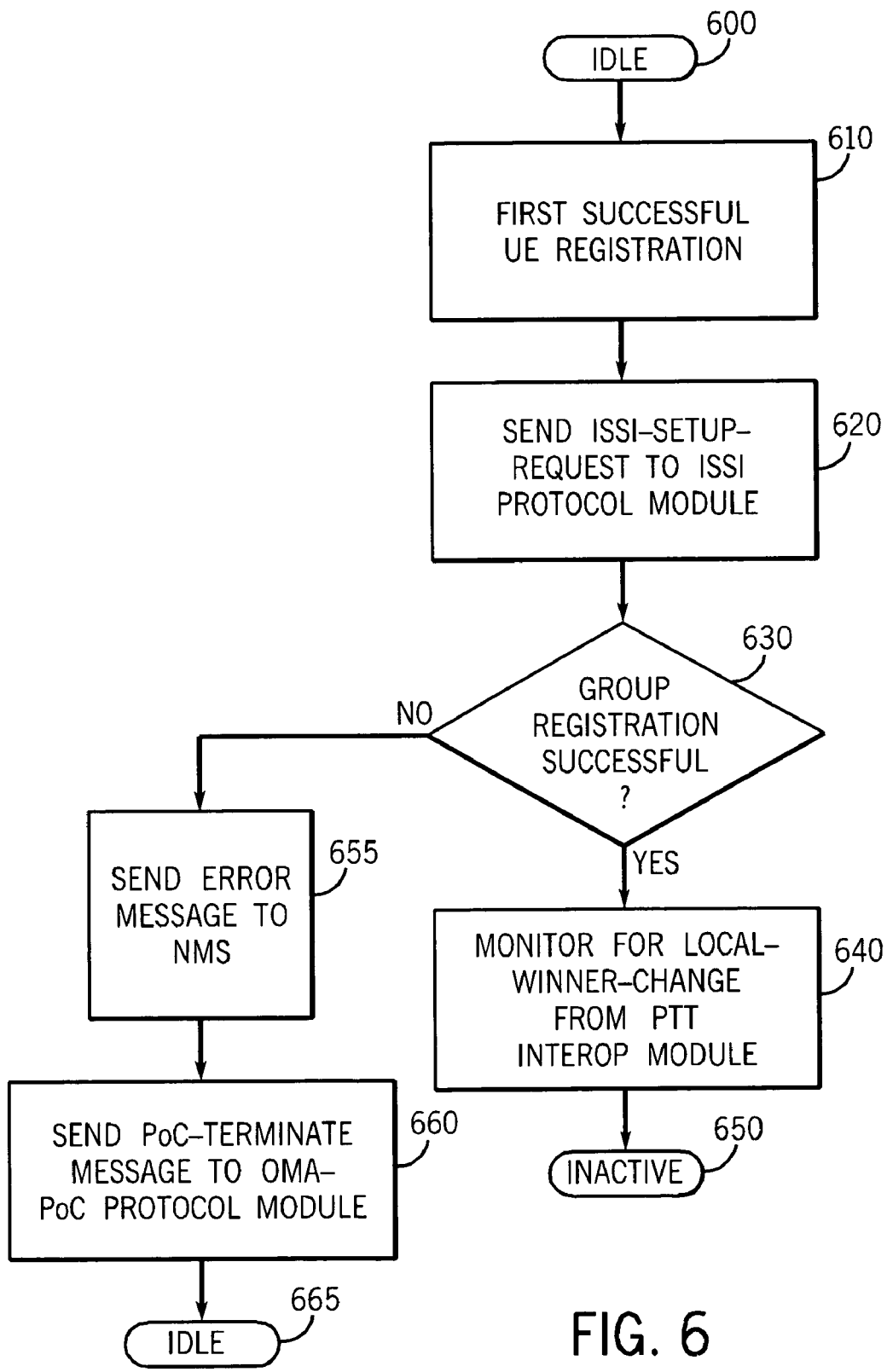
FIG. 6 shows an illustrative flow chart for a method of operating the present invention in accordance with the principles of the invention when the tributary RTP segment is persistent and the upstream RTP segment is non-persistent at the idle state.

FIG. 6 shows an illustrative flow chart for a method of operating the present invention in accordance with the principles of the invention when the tributary RTP segment is persistent and the upstream RTP segment is non-persistent at the idle state.

The process is entered in step 600 (FIG. 6), with Call Control Interop Module 242 (FIG. 2) in an idle state, i.e., no UEs are registered to Gateway 10 (FIG. 3) for the talk group, Gateway 10 is not registered to the home RFSS, e.g., home RFSS 350 (FIG. 3), and there is no SIP/RTP connection between Gateway 10 and home RFSS 350.

In step 610 (FIG. 6), upon receipt of a successful registration with Gateway 10 (FIG. 3) by a UE, e.g., UE 335-1, a tributary RTP segment is set up between UE 335-1 and Gateway 10. OMA-PoC Protocol Module 220 (FIG. 2) sends a PoC-group-register message to Call Control Interop Module 242 to indicate that UE 335-1 (FIG. 3) has registered at Gateway 10.

In step 620 (FIG. 6), upon receipt of the PoC-group-register message, Call Control Interop Module 242 (FIG. 2) sends an ISSI-setup-request to ISSI Protocol Module 260 to set up an RTP connection with home RFSS 350 (FIG. 3).

In step 630 (FIG. 6), it is necessary to determine, upon receipt of an ISSI-registration-response from ISSI Protocol Module 260 (FIG. 2) to Call Control Interop Module 242, whether the group registration with home RFSS 350 (FIG. 3) was successful.

If the test result in conditional branch point 630 (FIG. 6) is NO, indicating that the talk group registration failed, then control is passed to step 655.

In step 655 (FIG. 6), Call Control Interop Module 242 (FIG. 2) generates an error message, e.g., home RFSS unreachable, to a network management system (NMS), not shown.

In step 660 (FIG. 6), Call Control Interop Module 242 (FIG. 2) sends a PoC-terminate message to OMA-PoC Protocol Module 220 which indicates that the talk group is terminated and OMA-PoC Protocol Module 220 should de-register any registered UEs, e.g., UEs 335 (FIG. 3).

In step 665 (FIG. 6), Call Control Interop Module 242 (FIG. 2) enters the idle state.

If the test result in conditional branch point 630 (FIG. 6) is YES, indicating that the group registration was successful, then control is passed to step 640.

In step 640 (FIG. 6), Call Control Interop Module 242 (FIG. 2) monitors for a PoC-local-winner-change message from PTT Interop Module 244 having a non-null value, i.e., a floor request from UE 335-1.

In step 650 (FIG. 6), Call Control Interop Module 242 (FIG. 2) enters the inactive state, i.e., some of UEs 335 have been registered to Gateway 10 (FIG. 3) and RTP connections are set up between them and Gateway 10 (FIG. 3). Gateway 10 (FIG. 3) is registered to home RFSS 350, but there is no RTP connection between Gateway 10 (FIG. 3) and home RFSS 350.

Figure 7:
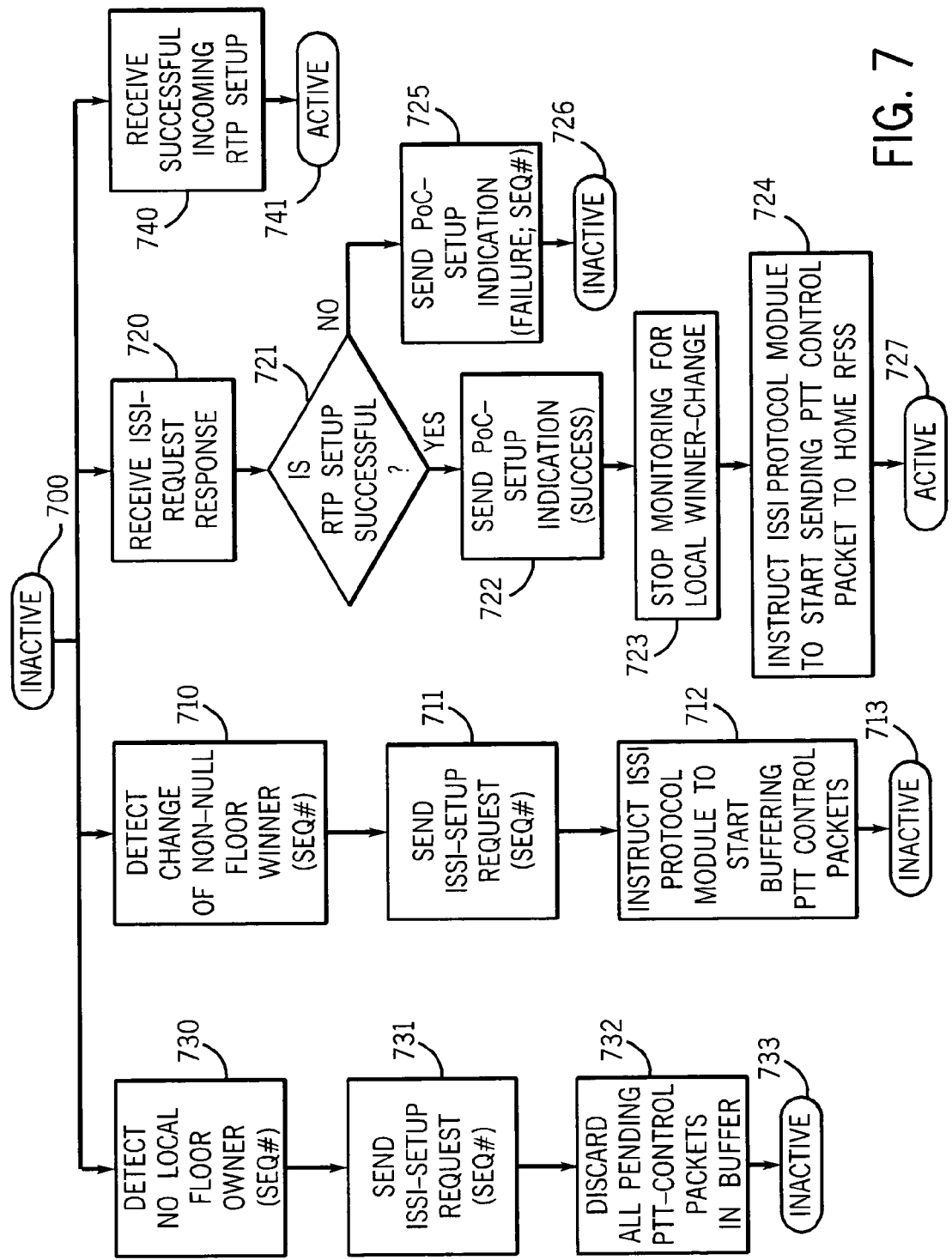
FIG. 7 shows an illustrative flow chart for a method of operating the present invention in accordance with the principles of the invention when the tributary RTP segment is persistent and the upstream RTP segment is non-persistent at the inactive state.

FIG. 7 shows an illustrative flow chart for a method of operating the present invention in accordance with the principles of the invention when the tributary RTP segment is persistent and the upstream RTP segment is non-persistent at the inactive state.

The process is entered in step 700 (FIG. 7), with Call Control Interop Module 242 (FIG. 2) in the inactive state, i.e., some UEs have been registered to Gateway 10 and RTP connections are set up between the UEs and Gateway 10. Gateway 10 is registered to home RFSS 350, but there is no RTP connection between Gateway 10 and home RFSS 350. Call Control Interop Module 242 monitors for 4 events, described in steps 710, 720, 730, and 740.

In step 710 (FIG. 7), Call Control Interop Module 242 (FIG. 2) monitors for a change of local floor ownership. The change of local floor ownership is detected by receiving a PoC-current-local-winner with a non-null value and a new sequence number.

In step 711 (FIG. 7), Call Control Interop Module 242 (FIG. 2) sends an ISSI-setup-request, with the sequence number, to ISSI Protocol Module 260.

In step 712 (FIG. 7), Call Control Interop Module 242 (FIG. 2) instructs Transmission InterOp Module 246 to start buffering push-to-talk control packets from the ISSI Protocol Module 260 to send to home RFSS 350.

In step 713 (FIG. 7), Call Control Interop Module 242 (FIG. 2) remains in the inactive state.

In step 720 (FIG. 7), Call Control Interop Module 242 (FIG. 2) receives a ISSI-request-response from ISSI Protocol Module 260.

In step 721 (FIG. 7), it is necessary to determine whether the RTP set-up was successful.

If the test result in conditional branch point 721 (FIG. 7) is YES, indicating that the RTP set-up was successful, then control is passed to step 722.

In step 722 (FIG. 7), Call Control Interop Module 242 (FIG. 2) will send a PoC-setup-indication to OMA-PoC Protocol Module 220.

In step 723 (FIG. 7), Call Control Interop Module 242 (FIG. 2) will stop the monitoring for local winner change.

In step 724 (FIG. 7), Call Control Interop Module 242 (FIG. 2) instructs Transmission InterOp Module 246 to start sending push-to-talk control packet in the buffet to the home RFSS. Form this point on, RTP packets will be forwarded between the OMA-PoC network 20 to P25 Network 30 by Transmission InterOp Module 246.

In step 727 (FIG. 7), Call Control Interop Module 242 (FIG. 2) enters the active state, i.e., some UEs have been registered to Gateway 10 and RTP connections are set up between the UEs and Gateway 10. Gateway 10 is registered to home RFSS 350, and there is a RTP connection between Gateway 10 and home RFSS 350.

If the test result in conditional branch point 721 (FIG. 7) is NO, indicating that the RTP set-up was successful, then control is passed to step 725.

In step 725 (FIG. 7), the ISSI-request-response from ISSI Protocol Module 260 (FIG. 2) contains a sequence number which identifies the latest request for which the unsuccessful RTP setup applies. Call Control Interop Module 242 sends a PoC-CC-setup-indication message to OMA-PoC Protocol Module 220 including the sequence number. Based on this sequence number, OMA-PoC Protocol Module 220 may send the appropriate TB-Deny messages to UEs 335.

In step 726 (FIG. 7), Call Control Interop Module 242 (FIG. 2) remains in the inactive state.

In step 730 (FIG. 7), Call Control Interop Module 242 (FIG. 2) detects that there is no current floor winner by receiving a PoC-current-local-winner message with a null value.

In step 731 (FIG. 7), Call Control Interop Module 242 (FIG. 2) sends an ISSI-setup-request with a null value to the ISSI Protocol Module 260.

In step 732 (FIG. 7), Call Control Interop Module 242 (FIG. 2) instructs Transmission InterOp Module 246 to discard all PTT control packets in the pending transmit queue.

In step 733 (FIG. 7), Call Control Interop Module 242 (FIG. 2) enters the inactive state.

In step 740 (FIG. 7), Call Control Interop Module 242 (FIG. 2) receives the ISSI-incoming-setup message from the ISSI Protocol Module 260. This indicates that a RTP connection has been set up successfully between Gateway 10 and home RFSS 350.

In step 741 (FIG. 7), Call Control Interop Module 242 (FIG. 2) enters the active state.

Figure 8:
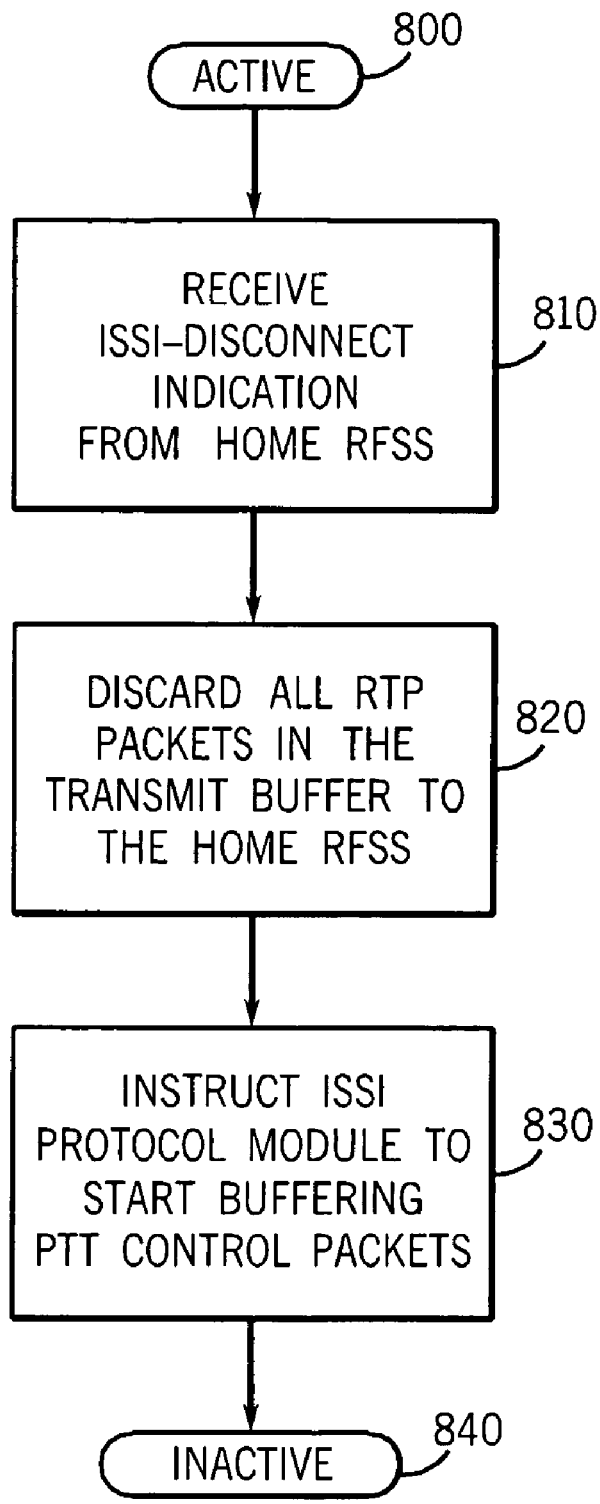
FIG. 8 shows an illustrative flow chart for a method of operating the present invention in accordance with the principles of the invention when the tributary RTP segment is persistent and the upstream RTP segment is non-persistent at the active state.

FIG. 8 shows an illustrative flow chart for a method of operating the present invention in accordance with the principles of the invention when the tributary RTP segment is persistent and the upstream RTP segment is non-persistent at the active state.

The process is entered in step 800 (FIG. 8), with Call Control Interop Module 242 (FIG. 2) in an active state In step 810 (FIG. 8), Call Control Interop Module 242 (FIG. 2) receives a ISSI-disconnect-indication from ISSI Protocol Module 260.

In step 820 (FIG. 8), Call Control Interop Module 242 (FIG. 2) instructs Transmission InterOp Module 246 to discard all RTP packets in its transmit buffer.

In step 830 (FIG. 8), Call Control Interop Module 242 (FIG. 2) monitors for a PoC-local-winner-change message, with a non-null value, from OMA-PoC Protocol Module 220.

In step 840 (FIG. 8), Call Control Interop Module 242 (FIG. 2) enters the inactive state.

FIG. 4 through FIG. 8 describes embodiments of the processing logic for configuration 1 and configuration 2. Those of ordinary skill in the art may readily extend the processing logic presented herein to accommodate configuration 3 and configuration 4. The key points are: 1) when operating in the persistent mode of operation, RTP connectivity is activated or deactivated based on group membership or lack of group membership, 2) when operating in the non-persistent mode of operation, RTP connectivity is activated or deactivated based on voice activity or inactivity, and 3) when interoperating between persistent mode and non-persistent mode, persistent RTP connections may need to monitor for voice activity or inactivity by monitoring for push-to-talk control messages and/or media packets.

Figure 9:
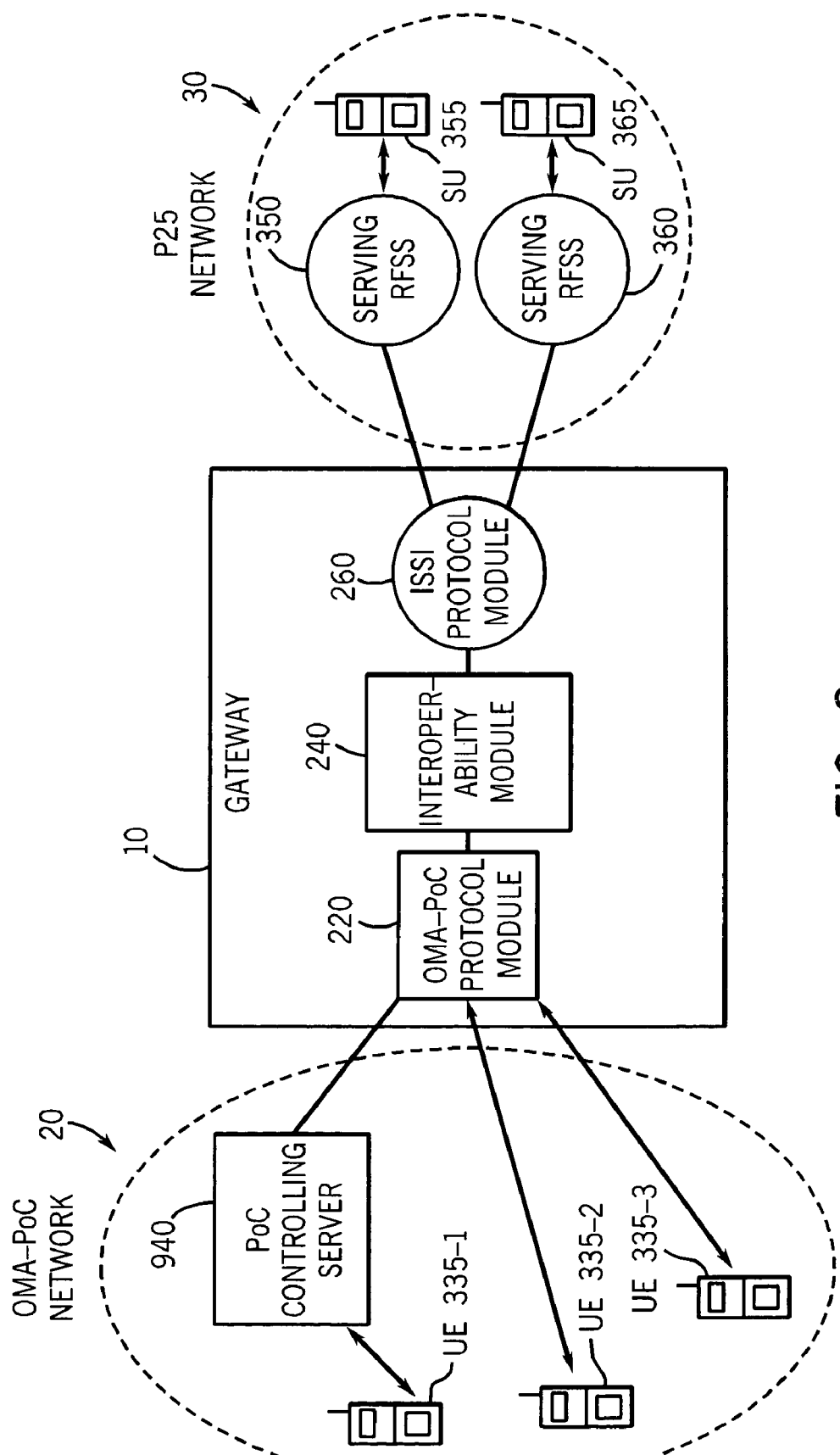
FIG. 9 shows another illustrative view of a network diagram arranged in accordance with the principles of the invention in which the home of the push-to-talk talk group resides in the commercial wireless network.

FIG. 9 shows another illustrative view of a network diagram arranged in accordance with the principles of the invention in which the home of the push-to-talk talk group resides in the commercial wireless network. Specifically, in FIG. 9, the home of the push-to-talk talk group, i.e., the push-to-talk server, resides at PoC Controlling Server 940 in OMA-PoC based network 20. All of the UEs, i.e., UE 335-1, UE 335-2, UE 335-3, collectively hereinafter UEs 335, in OMA-PoC based network 20 and Gateway 10 are connected to PoC Controlling Server 940 through RTP. OMA-PoC Protocol Module 220 of Gateway 10 functions as a UE for this talk group arrangement. Also, Gateway 10 is connected to other serving RFSS, e.g. RFSS 350 and RFSS 360 in P25 network 30, i.e., the public safety wireless network. ISSI Protocol Module 260 of Gateway 10 functions as a home RFSS to serving RFSS 350 and serving RFSS 360.

The above-described aspects of the present invention apply to the arrangement of FIG. 9. However, the roles of OMA-PoC Protocol Module 220 and ISSI Protocol Module 260 are reversed. Also, the direction of information flow is reversed for the PTT Interop Module 244. PoC Controlling Server 940 determines the global winner and informs Gateway 10 of the decision. Furthermore, ISSI Protocol Module 260, which acts as the home RFSS for this talk group for P25 Network 30, determines the local winner from P25 Network 30. The process logic from FIGS. 4-7 applies for this arrangement.

The four configurations of persistent and non-persistent modes of operation for Gateway 10 apply to the arrangement of FIG. 9. In FIG. 9, the connection between PoC Controlling Server 940 and Gateway 10 is the upstream segment. Also, the connection between Gateway 10 and the RFSSs, e.g., RFSS 350 and/or RFSS 360, are tributary segments.

Illustratively, when both RTP segments operate in the persistent mode, i.e., configuration 1, a tributary segment connection is established, i.e., set up, between a serving RFSS, e.g., RFSS 360, and Gateway 10 when a wireless communications handset, e.g., SU 365, joins a talk group at RFSS 360 and completes its registration to Gateway 10. RFSS 360 may serve one or more wireless communications handsets. The registration of RFSS 360 with Gateway 10 triggers the upstream RTP segment connection. The upstream RTP segment connection remains active until all wireless communications handsets in the public safety wireless network leave the push-to-talk group call. Then Gateway 10 tears down the upstream RTP segment connection. The tributary RTP segment connection between RFSS 360 and Gateway 10 remains active until all wireless communications handsets at RFSS 360 leave the push-to-talk group call. Then Gateway 10 tears down the tributary RTP segment connection to RFSS 360. There could be more than one tributary RTP segment connection as there may be many serving RFSS connected to Gateway 10.

Also illustratively, when a persistent upstream RTP segment connection is established between PoC Controlling Server 940 and Gateway 10 and a non-persistent tributary RTP segment connection is established between Gateway 10 and a serving RFSS that serves a SU, i.e., configuration 3 with the push-to-talk server in the commercial wireless network, the non-persistent tributary RTP segment connection remains active until all wireless communications handsets at the serving RFSS leave the push-to-talk group call. Then Gateway 10 tears down the non-persistent tributary RTP segment connection. The persistent upstream RTP segment connection remains active until all wireless communications handsets from the public safety network leave the push-to-talk group call, i.e., the call is inactive. Then Gateway 10 tears down the persistent upstream RTP segment connection.

In practice, wireless telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a differing order, or steps may be added, deleted, or modified.

Although the present invention has been described in detail for OMA-PoC and ISSI based networks, the invention will support any push-to-talk control protocol by replacing the OMA-PoC protocol module or the ISSI protocol module with the appropriate protocol stacks.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A gateway for interconnecting a commercial wireless network and a public safety wireless network for a communications session, comprising:
    a first component operable to manage messages received in a first format from the commercial wireless network intended for the public safety wireless network;
    a second component connected to the first component, wherein the second component translates messages received in the first format into a second format, and wherein the second component translates messages received in the second format into the first format, and wherein the second component performs audio codec translations when different codecs are used in the commercial wireless network and the public safety wireless network; and
    a third component connected to the second component, wherein the third component is operable to manage messages received in the second format from the public safety wireless network intended for the commercial wireless network.

2. The gateway of claim 1 wherein the commercial wireless network and the public safety wireless network support push-to-talk group calls.

3. The gateway of claim 2 wherein the gateway is operable to establish a first connection with a wireless communications handset of a push-to-talk group call in the commercial wireless network, and wherein the gateway is operable to establish a second connection with a push-to-talk server in the public safety wireless network, and wherein the first connection is triggered upon registration of the wireless communications handset with the gateway and the second connection is triggered based upon membership of the wireless communications handset to a push-to-talk group served by the gateway.

4. The gateway of claim 3 wherein the gateway is operable to tear down the first connection when the wireless communications handset leaves the push-to-talk group call, and wherein the gateway is operable to tear down the second connection when all wireless communications handsets in the commercial wireless network leave the push-to-talk group call.

5. The gateway of claim 2 wherein the gateway is operable to establish a first connection with a wireless communications handset of a push-to-talk group call in the commercial wireless network, and wherein the gateway is operable to establish a second connection with a push-to-talk server in the public safety wireless network, and wherein the first connection is triggered upon registration of the wireless communications handset with the gateway and the second connection is triggered based upon a detection of push-to-talk control messages or media traffic by the gateway.

6. The gateway of claim 5 wherein the gateway is operable to tear down the first connection when the wireless communications handset leaves the push-to-talk group call, and wherein the gateway is operable to tear down the second connection when the push-to-talk group call is inactive.

7. The gateway of claim 2 wherein the gateway is operable to establish a first connection with a wireless communications handset of a push-to-talk group call in the commercial wireless network, and wherein the gateway is operable to establish a second connection with a push-to-talk server in the public safety wireless network, and wherein the first connection is triggered based upon a detection of push-to-talk control messages or media traffic by the gateway and the second connection is triggered based upon membership of the wireless communications handset to a push-to-talk group served by the gateway.

8. The gateway of claim 7 wherein the gateway is operable to tear down the first connection when the push-to-talk group call is inactive, and wherein the gateway is operable to tear down the second connection when all wireless communications handsets from the commercial wireless network leave the push-to-talk group call.

9. The gateway of claim 2 wherein the gateway is operable to establish a first connection with a wireless communications handset of a push-to-talk group call in the commercial wireless network, and wherein the gateway is operable to establish a second connection with a push-to-talk server in the public safety wireless network, and wherein the gateway is operable to tear down the first connection and the second connection when the push-to-talk group call is inactive.

10. The gateway of claim 2 wherein the gateway is operable to establish a first connection with a push-to-talk server in the commercial wireless network, and wherein the gateway is operable to establish a second connection with a system controller operable to serve one or more wireless communications handsets in the public safety wireless network, and wherein the first connection is triggered upon registration of the system controller with the gateway and wherein the second connection is triggered when a wireless communications handset joins the talk group at the system controller.

11. The gateway of claim 10 wherein the gateway is operable to tear down the first connection when all wireless communications handsets in the public safety wireless network leave the push-to-talk group call, and wherein the gateway is operable to tear down the second connection when all wireless communications handsets served by the system controller leave the push-to-talk group call.

12. The gateway of claim 2 wherein the gateway is operable to establish a first connection with a push-to-talk server in the commercial wireless network, and wherein the gateway is operable to establish a second connection with a system controller operable to serve one or more wireless communications handsets in the public safety wireless network, and wherein the gateway is operable to tear down the first connection when all wireless communications handsets in the public safety wireless network leave the push-to-talk group call, and wherein the gateway is operable to tear down the second connection when the push-to-talk group call is inactive.

13. The gateway of claim 1 wherein the first component is operable to manage Real Time Protocol (RTP), Session Invitation Protocol (SIP), and Talk Burst Control Protocol (TBCP)/Real Time Control Protocol (RTCP) messages received from the commercial wireless network.

14. The gateway of claim 13 wherein the first component has separate interfaces for the RTP, SIP, and TBCP/RTCP messages received from the commercial wireless network.

15. The gateway of claim 1 wherein the third component is operable to manage RTP and SIP messages received from the public safety wireless network.

16. The gateway of claim 15 wherein the third component has separate interfaces for the RTP and SIP messages received from the public safety wireless network.

17. The gateway of claim 1 wherein the second component further comprises a call control component operable to set up and tear down RTP connections between wireless communications handsets in the commercial wireless network and the public safety wireless network.

18. The gateway of claim 17 wherein the second component further comprises a push-to-talk control component operable to arbitrate calls between wireless communications handsets in the commercial wireless network and the public safety wireless network.

19. The gateway of claim 18 wherein the second component further comprises a transmission control component operable to transfer media packets between the wireless communications handsets in the commercial wireless network and the public safety wireless network.

20. The gateway of claim 1 wherein the commercial wireless network comprises at least one of Universal Mobile Telecommunications System (UMTS), Code Division Multiple Access Data Optimized (COMA-DO), Wireless Fidelity (Wi-fi), and Worldwide Interoperability for Microwave Access (Wi-Max) networks.

21. The gateway of claim 1 wherein the commercial wireless network is a Worldwide Interoperability for Microwave Access (Wi-Max) network.

22. The gateway of claim 1 wherein the second component filters unnecessary messages from the first component and third component.

23. A method of coordinating real-time protocol (RTP) setup when interconnecting a first wireless network and a second wireless network with a gateway to support push-to-talk group calls, the method comprising the steps of:

establishing a tributary RTP connection between the gateway and a wireless communications handset of a push-to-talk group call in the first wireless network;

establishing an upstream RTP connection between the gateway and a push-to-talk server in the second wireless network;

translating messages received in a first format from the wireless communications handset into a second format of the second wireless network;

translating messages received in the second format from the second wireless network into the first format of the first wireless network; and performing audio codec translations when different codecs are used in the first wireless network and the second wireless network.

24. The method of claim 23 wherein the first wireless network is a commercial wireless network and the second wireless network is a public safety wireless network.

25. The method of claim 24 further comprising the steps of;

tearing down the tributary RTP connection when the wireless communications handset leaves the push-to-talk group call; and tearing down the upstream RTP connection when all wireless communications handsets from the commercial wireless network leave the push-to-talk group call.

26. The method of claim 24 further comprising the steps of:

tearing down the tributary RTP connection when the wireless communications handset leaves the push-to-talk group call; and tearing down the upstream RTP connection when the push-to-talk group call is inactive.

27. The method of claim 24 further comprising the steps of:

tearing down the tributary RTP connection when the push-to-talk group call is inactive; and tearing down the upstream RTP connection when all wireless communications handsets from the commercial wireless network leave the push-to-talk group call.

28. The method of claim 24 further comprising the step of tearing down the tributary RTP connection and the upstream RTP connection when the push-to-talk group call is inactive.

29. The method of claim 24 wherein the messages received from the wireless communications handset in the commercial wireless network comprise Real Time Protocol (RTP), Session Invitation Protocol (SIP), and Talk Burst Control Protocol (TBCP)/Real Time Control Protocol (RTCP) messages.

30. The method of claim 24 wherein the messages received from a system controller in the public safety wireless network comprise RTP and SIP messages.

31. The method of claim 23 wherein the first wireless network is a public safety wireless network having a system controller operable to serve the wireless communications handset and the second wireless network is a commercial wireless network.

32. The method of claim 31 further comprising the steps of:

tearing down tributary RTP connection to the system controller when all wireless communications handset from the public safety network leave the push-to-talk group call served by the system controller, and tearing down the upstream RTP connection when all wireless communications handsets in the public safety network leave the push-to-talk group call.

33. The method of claim 31 further comprising the steps of:

tearing down the tributary RTP connection to the system controller when the push-to-talk group call is inactive; and tearing down the upstream RTP connection when all wireless communications handsets from the public safety wireless network leave the push-to-talk group call.

34. An apparatus for coordinating real-time protocol (RTP) setup when interconnecting a public safety wireless network and a commercial wireless network to support push-to-talk group calls, comprising:

means for establishing a first RTP connection between a gateway and a push-to-talk server in the commercial wireless network;

means for establishing a second RTP connection between the gateway and a system controller operable to serve one or more wireless communications handsets of a push-to-talk group call in the public safety wireless network;

means for translating messages received in a first format from the commercial wireless network into a second format of the system controller;

means for translating messages received in the second format from the system controller into the first format of the commercial wireless network; and means for performing audio codec translations when different codecs are used in the first wireless network and the second wireless network.

\* \* \* \* \*